US008719771B2

(12) United States Patent
Ovadia et al.

(10) Patent No.: US 8,719,771 B2
(45) Date of Patent: May 6, 2014

(54) METHOD AND SYSTEM FOR TEST REDUCTION AND ANALYSIS

(75) Inventors: Meir Ovadia, Zur-Igal (IL); Marat Teplitsky, Rishon Le-Zion (IL); Rodion Melnikov, Modiin (IL)

(73) Assignee: Cadence Design Systems, Inc., San Jose, CA (US)

( * ) Notice: Subject to any disclaimer, the term of this patent is extended or adjusted under 35 U.S.C. 154(b) by 615 days.

(21) Appl. No.: 12/568,005

(22) Filed: Sep. 28, 2009

(65) Prior Publication Data

US 2011/0078651 A1    Mar. 31, 2011

(51) Int. Cl.
*G06F 9/44* (2006.01)

(52) U.S. Cl.
USPC .......................................................... 717/105

(58) Field of Classification Search
USPC .......................................................... 717/105
See application file for complete search history.

(56) References Cited

U.S. PATENT DOCUMENTS

| | | | | |
|---|---|---|---|---|
| 5,892,947 A | * | 4/1999 | DeLong et al. | 717/100 |
| 7,174,536 B1 | * | 2/2007 | Kothari et al. | 717/109 |
| 7,437,718 B2 | * | 10/2008 | Fournet et al. | 717/133 |
| 7,958,495 B2 | * | 6/2011 | Kelso | 717/124 |
| 2003/0221182 A1 | * | 11/2003 | Tip et al. | 717/116 |
| 2005/0166096 A1 | * | 7/2005 | Yount et al. | 714/38 |
| 2006/0143596 A1 | * | 6/2006 | Miyashita et al. | 717/131 |
| 2006/0168565 A1 | * | 7/2006 | Gamma et al. | 717/122 |
| 2008/0263506 A1 | * | 10/2008 | Broadfoot et al. | 717/104 |
| 2010/0262574 A1 | * | 10/2010 | Zhou | 706/50 |
| 2011/0289488 A1 | * | 11/2011 | Ghosh | 717/131 |

OTHER PUBLICATIONS

Smith, "A Theory of Distributed Time", Dec. 1993, Carnegi Meilon University.*
Simser et al. "Supervision of eal-Time Software Systems Using Optimistic Path Predic~iona nd Rollbacks", 1996, IEEE.*

* cited by examiner

*Primary Examiner* — Wei Zhen
*Assistant Examiner* — Junchun Wu
(74) *Attorney, Agent, or Firm* — Vista IP Law Group, LLP

(57) ABSTRACT

Disclosed is a method, system, and computer program product that reduces the size of a failing test. A tree is created from the test's programming code, where the tree represents the syntactical and the semantic bounds between the programming code elements. By analyzing this tree and iteratively pruning the irrelevant sub-trees it is possible to eliminate many non necessary parts of the code, and recreate a new legal test, which represents the same error, but is potentially much smaller and therefore easier to understand and debug.

21 Claims, 12 Drawing Sheets of determining whether a design meets requirements. In practice, verification is the process of identifying and removing as many functional bugs in the hardware and software as possible. The oldest form of verification is to build it, run it, and watch what happens.

METHOD AND SYSTEM FOR TEST REDUCTION AND ANALYSIS

BACKGROUND

"Verification" is the term that is often used to refer to the process of determining whether a design meets requirements. In practice, verification is the process of identifying and removing as many functional bugs in the hardware and software as possible. The oldest form of verification is to build it, run it, and watch what happens.

Hardware verification may be performed by verifying individual functional blocks in a design using constrained random testbenches, code coverage, assertion coverage, and functional coverage. The key is that a set of "tests" are created to verify the expected performance of the hardware design. For example, verification test data can be generated for the device under test using a constraint-based random test generation process, in which the verification test data is defined in response to constraint data and an input/output data model. Such constraint data and input/output data model may be defined using a verification specific programming language, such as the "e" programming language.

For software, essential steps for the modern software development process are the steps of testing and debugging software to ensure that the software will work and function as expected in its intended processing environment. These steps are usually implemented as methodical processes of finding and reducing the number of defects in the software program to make it behave as expected or intended. To avoid the cumbersome, time-consuming, and complicated task of manually performing software verification, tests may be created to verify the software. Like the tests defined for hardware verification, tests for software verification may be generated based upon input/output data models and constraint data.

Verification may also need to be performed on designs that include both hardware and software elements. For example, embedded software is a type of software (or firmware) that is designed to interact and interface in an integral way with a specific system or item of hardware. Designing and testing embedded software is considered to be very challenging for many designers since it normally require a multi-disciplinary approach to systems design that must take into account multifaceted effects throughout the different parts of the system. The programmer must consider many acute constraints for a successful design, such as energy consumption, memory space, criticality and safety considerations, and execution time. The task of verifying such designs is difficult since the software program is tightly coupled to other devices or subsystems, and it often difficult to determine and test the complex interactions between the software and the other subsystems and components in the overall system. Moreover, changes in one part of the system may cause unexpected results and errors to emerge in other parts the system. Therefore, adequate tests are particularly important to the process of verifying deigns having both hardware and software.

Modern software/hardware verification environments often require many thousands of tests written in some programming language. Those tests may be automatically generated by machine or manually created by developers and engineers.

As a natural part of the development cycle some of those tests fail, and need to be debugged by the developers in order to capture and fix the error. The traditional way to debug and minimize failures is doing it by hand in a manner of trial and error. However, the effort to understand a very complex test is often exhaustive, particularly if the complex test is generated by a machine to include a very large number test statements and elements. Therefore, with complex tests, it may be extremely difficult to understand and debug an error manually.

SUMMARY

According to some embodiments of the invention, an inventive method, system, and computer program product is employed that reduces the size of a failing test. A tree is created from the test's programming code, where the tree represents the syntactical and the semantic bounds between the programming code elements. By analyzing this tree and iteratively pruning the irrelevant sub-trees it is possible to eliminate many non necessary parts of the code, and recreate a new legal test, which represents the same error, but is potentially much smaller and therefore easier to understand and debug.

Further details of aspects, objects, and advantages of the invention are described below in the detailed description, drawings, and claims. Both the foregoing general description and the following detailed description are exemplary and explanatory, and are not intended to be limiting as to the scope of the invention.

DETAILED DESCRIPTION

The present invention provides improved approaches for handling and processing verification information, tests and/or environments for verifying software, hardware, or a combination of software and hardware. According to some embodiments of the invention, an inventive method, system, and computer program product is employed that reduces the size of a failing test. By reducing or minimizing the size of the failing test, engineers will be able to more effectively and efficiently read, debug, analyze, and classify the test and its problems.

For the purposes of illustration, various embodiments of the invention will be described and explained with respect to software programs written in and having the syntax of specific programming languages, such as the C or e programming languages. It is noted, however, that the invention may be applied to software corresponding to any programming language, and is therefore not to be limited to any of the specific programming languages or language syntaxes described herein unless otherwise claimed.

Figure 1:
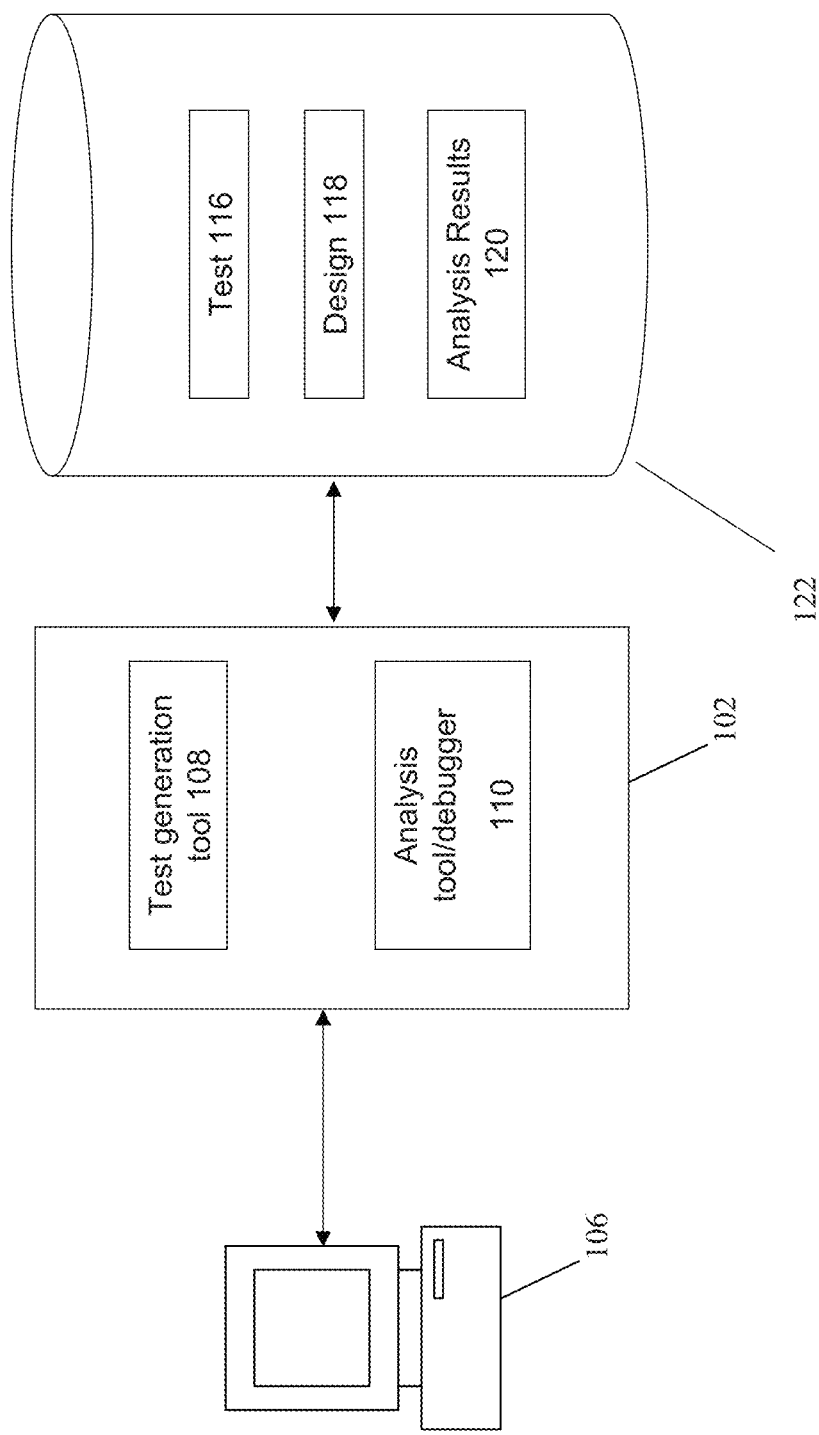
FIG. 1 shows a high-level illustration of an architecture for generating, analyzing, and minimizing tests for verification, according to some embodiments of the invention.

FIG. 1 illustrates a general architecture for using a system 102 to perform test generation and analysis according to some embodiments of the invention. System 102 includes a test generation tool 108, which in some embodiments is a computer aided design (CAD) tools or electronic design automation (EDA) tool that has the capability to generate one or more tests 116 for a verification environment for testing a design 118 having hardware, software, or a combination of both hardware and software. Any suitable automated test generation tool 108 may be employed in conjunction with the present invention. It is noted that the present invention may also be used in conjunction with tests that are manually generated.

During the development of design 118, the system 102 applies the tests 116 against the design to generally analyze, verify, and improve the configuration, design, and completeness of design 118. Based upon the application of tests 116 against design 118, analysis results 120 may be obtained for the analysis and verification of design 118. The analysis results 120, tests 116, and/or design 118 may be stored in one or more computer readable mediums 122 or displayed on a display device at one or more user stations 106.

The design 118 to be tested may include a software program having one or more source code modules or portions. A compiler can be employed to compile the software program into object code to be stored as an object file. Information about the software program can be extracted from either the object code or source code, e.g., using a debug information parser. The information is extracted for purposes of generating one or more verification tests 116 that include information about functions and variables within the software program. A testbench generator can be used to generate the one or more verification tests 116 based upon the function and variable information that has been extracted from the object code or source code.

Figure 2:
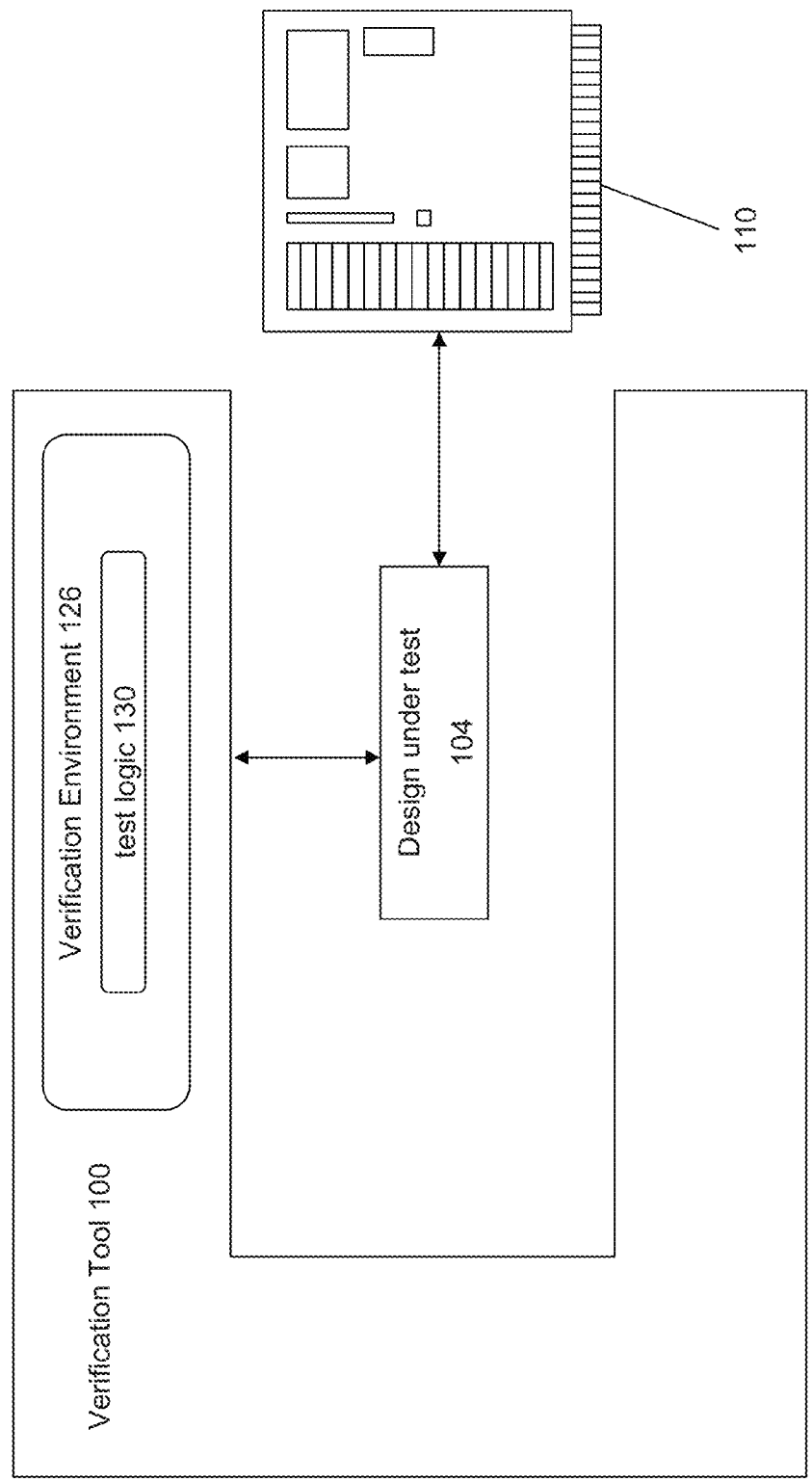
FIG. 2 shows a verification platform according to some embodiments of the invention.

A verification tool 100, as shown in the embodiment of FIG. 2, utilizes the verification test 116 to verify the functionality and performance of the software program. In some embodiments, the verification test 116 comprises a verification environment 226 having sufficient information to allow constructs within the verification tool 100 to interact and apply stimulus to the software program to perform verification and testing functions. The verification environment 226 is used to create activity that is similar to the way that the design of a product or component is expected to behave, thereby providing stimulus to actively and thoroughly test the design under test. The test verification environment may be implemented using test software 130 in a language specific to the test system. The design under test 104 may be the actual software that is being tested. Alternatively, the design under test may be modeled as a simulated design, e.g., to model the design of hardware and/or a hardware/software combination. The design under test 104 therefore generally comprises an executable model of the design, e.g., an executable software copy of a simulation model that can be simulated using simulation or formal verification techniques. The design under test 104 may comprise a portion to model a processor, memory, software, as well as other structures such as bus architectures and interconnects. The verification tool may operate on any suitable computing platform 110. As noted above, the generated verification test 116 is used by a verification tool 100 to test and stimulate the software program and/or hardware design. The verification tool 100 may implement one or more automated verification plans containing a set of goal metrics that are used to measure progress toward verification completion. By definition of the plan(s), if these metrics are achieved, the design is verified. One example approach to implementing the verification planning is to employ Coverage Driven Verification (CDV), which can be used to define the corner cases that need to be addressed, using automated, constrained random stimulus to address these corner cases. To perform CDV, the corner cases are converted into coverage points where the goal is to reach 100% coverage. Using random directed generation to reach coverage points may also result in new corner cases that engineers may not themselves have contemplated.

Modern software/hardware verification environments often require a large number of tests 116 written in a programming language. Those tests may be automatically generated by machine or manually created. As a natural part of the development cycle some of those tests fail, and debugged by the developers in order to capture and fix the error. The effort to understand a very complex test is often exhaustive, while the error could be represented by a much smaller test. This is especially correct if the tests are generated by a machine.

According to some embodiments of the invention, disclosed herein is an approach for implementing a test analysis tool 110 (FIG. 1) that reduces the size of a failing test. According to some embodiments, the invention creates a tree from the test's programming code. This tree represents the syntactical and the semantic bounds between the programming code elements. By analyzing this tree and iteratively pruning the irrelevant sub-trees it is possible to eliminate many non necessary parts of the code, and recreate a new legal test, which represents the same error, but is potentially much smaller and therefore easier to understand and debug.

Figure 3:
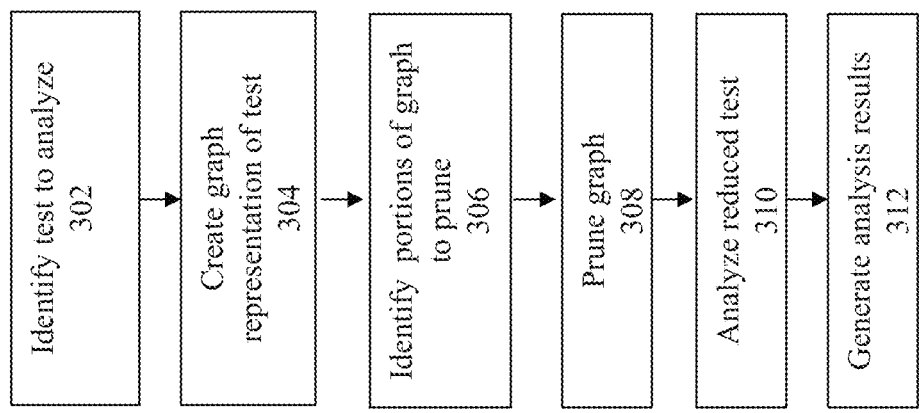
FIG. 3 shows a flowchart of a process for reducing a failing test according to some embodiments of the invention.

FIG. 3 shows a flowchart of a process for performing test analysis according to some embodiments of the invention. At 302, the process identifies a test to analyze. The test for analysis corresponds to a test that may have undergone some type of identified failure and for which debugging is required in order to understand the basis and extent of the failure.

At 304, a graph representation is created for the test, where a hierarchical graph that represents the failed test can be used for effective automatic failure analysis and test minimization. The graph should contain complete information about relations and dependences of logical elements and units of different levels of hierarchy within the design. This allows the graph to fully reproduce the original test code or its subsample.

According to some embodiments, the code structure graph can be implemented and represented as an abstract syntax tree (AST). As it contains complete information about the code, the whole test or its constituent part can be generated from the AST. The hierarchal tree can be generated using tree generation algorithm commonly employed within software compilers. Alternatively, the tree can be based upon the origin of a test created by a machine or tool, e.g., when a verification tool uses such a tree to automatically generate the verification tests.

Figure 4:
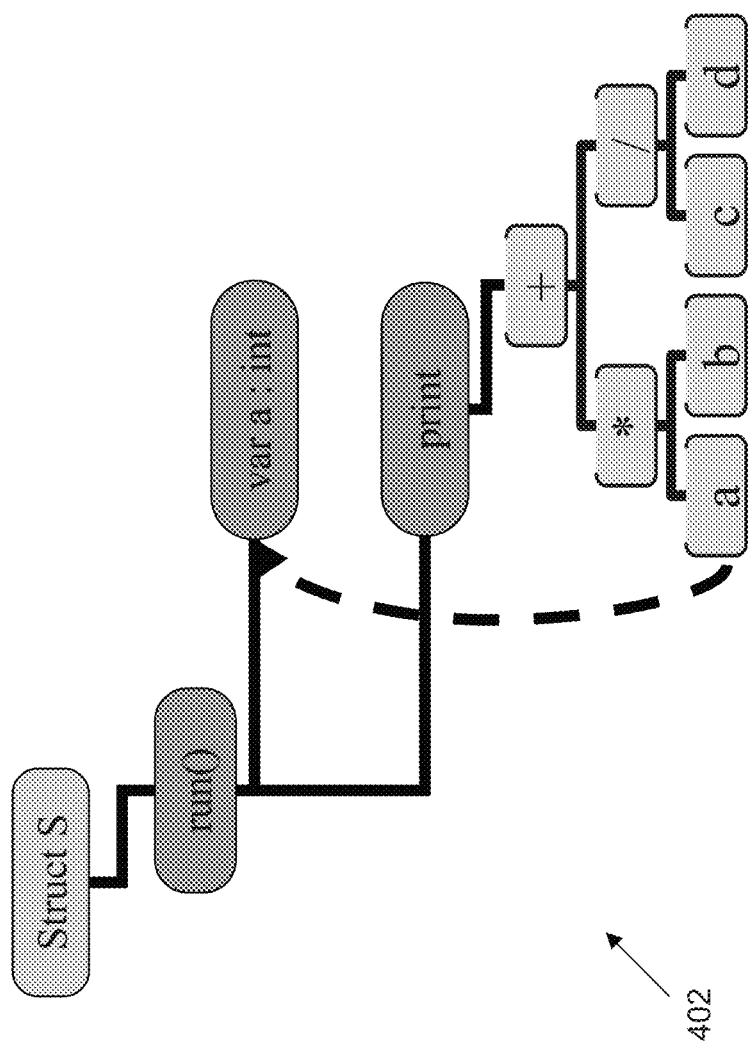
FIG. 4 illustrates an example tree according to some embodiments of the invention.

FIG. 4 illustrates a partial example of an AST tree 402 for the following test code example:

```
struct S {
  run ( ) {
    int a,b,c,d;
    print (a*b)+(c/d)
  }
}
```

Any type of relationship that can or should be analyzed can be represented in the tree 402. For example, both syntactic and semantic relationships can be represented in the tree. Syntactic relationships are based upon analysis of the language syntax for the code. Semantic relationships are based upon object/procedural usage or value relationships in the code. In the tree 402 of FIG. 4, the solid lines in the tree represent syntactic relations between elements in the programming language. The dashed line represents an example of a semantic relation, i.e., for the "a" variable in the code example. It is noted that there are additional relationships for "b", "c", "d" as well that can be represented with arrows, but have not been drawn in this figure to simplify the pictorial illustrations of the present concepts.

Figure 5:
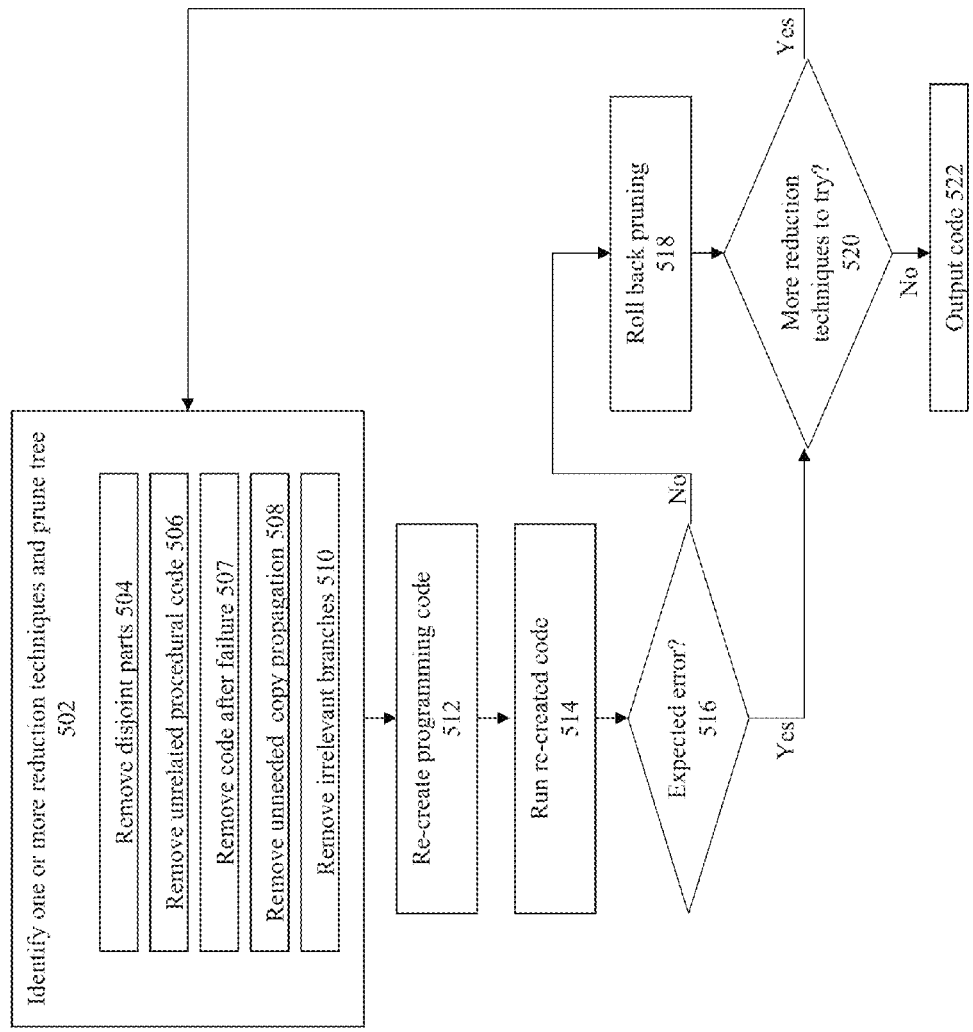
FIG. 5 shows a flowchart of a process for pruning a graph according to some embodiments of the invention.

At 306, the process identifies portions of the graph that should or can be pruned. Generally, the identified portions of the graph should correspond to portions of the code that do not need to be analyzed to properly analyze the failures in the test code. Therefore, the points of failure during the test/verification run should be located on the hierarchical graph. This is usually achievable based upon, for example, compilers that report line numbers of the errors. The line numbers can be linked to AST during the translation from the code. Any portions that graph that do not have dependencies or critical relationships with the points of failure for purposes of debugging analysis can be pruned from the tree. According to some embodiments, any number of one or more graph pruning techniques may be utilized to identify portions of the AST to prune. FIG. 5 and its related text disclose several example techniques that may be applied to identify portions of the graph to prune.

Thereafter, at 308, the identified portions of the graph may be pruned to reduce the size and complexity of the AST. The graph can be pruned by simply removing branches from the tree that have been identified as being non-essential to proper analysis of the failure points. At 310, the QA or verification engineer can thereafter perform analysis upon the reduced test code, and at 312, will generate analysis results to be displayed or stored.

FIG. 5 shows a flowchart of a process for performing graph pruning according to some embodiments of the invention. At 502, the process identifies and uses one or more reduction techniques to reduce the size of the hierarchical graph. Any suitable graph pruning technique may be employed within the scope of embodiments of the invention. Examples of pruning techniques that may be utilized in embodiments of the invention include (but are not limited to), for example: (a) removal of disjoint parts 504; (b) removal of unrelated procedural code 506; (c) removal of code after a failure 507; (d) removal of unneeded copy propagation 508; and (e) removal of irrelevant branches 510. Each of these example techniques are described in more detail below.

Application of these techniques will converge fastest when first applied upon the ones that act in the failure block level. This order unties linked variables and enables further reduction of neighboring blocks. Each technique reduces the number of nodes and links in the AST.

After the selected technique is applied, then at 512, the programming code is recreated based upon the pruned AST and is activated. At 514, the created test code is executed and checked for failure to see if the original error occurs.

A determination is made at 516 whether the received error is the same as what is expected based upon the original failure. Any suitable approach can be taken to check whether the errors on the re-created tree are the same as expected. For example, one general approach is to simply locate the new failure point on the existing AST, and compare it to the previous one. If the failure is not reproduced as expected, then the process rolls back the results of the pruning technique at 518.

At 520, a determination is made whether there are any further reduction techniques that should be attempted, e.g., in response to a failure at 516 to identify the expected errors for a previous technique that was rolled back. If so, then the process returns back to 502 to attempt the next pruning technique.

The set of pruning techniques are activated iteratively, until no further reduction is achieved by activating the entire set. At this point, the final AST is translated into programming code and outputted at 522. The iteration process is finite and is bounded by the number of nodes in the graph.

Figure 6:
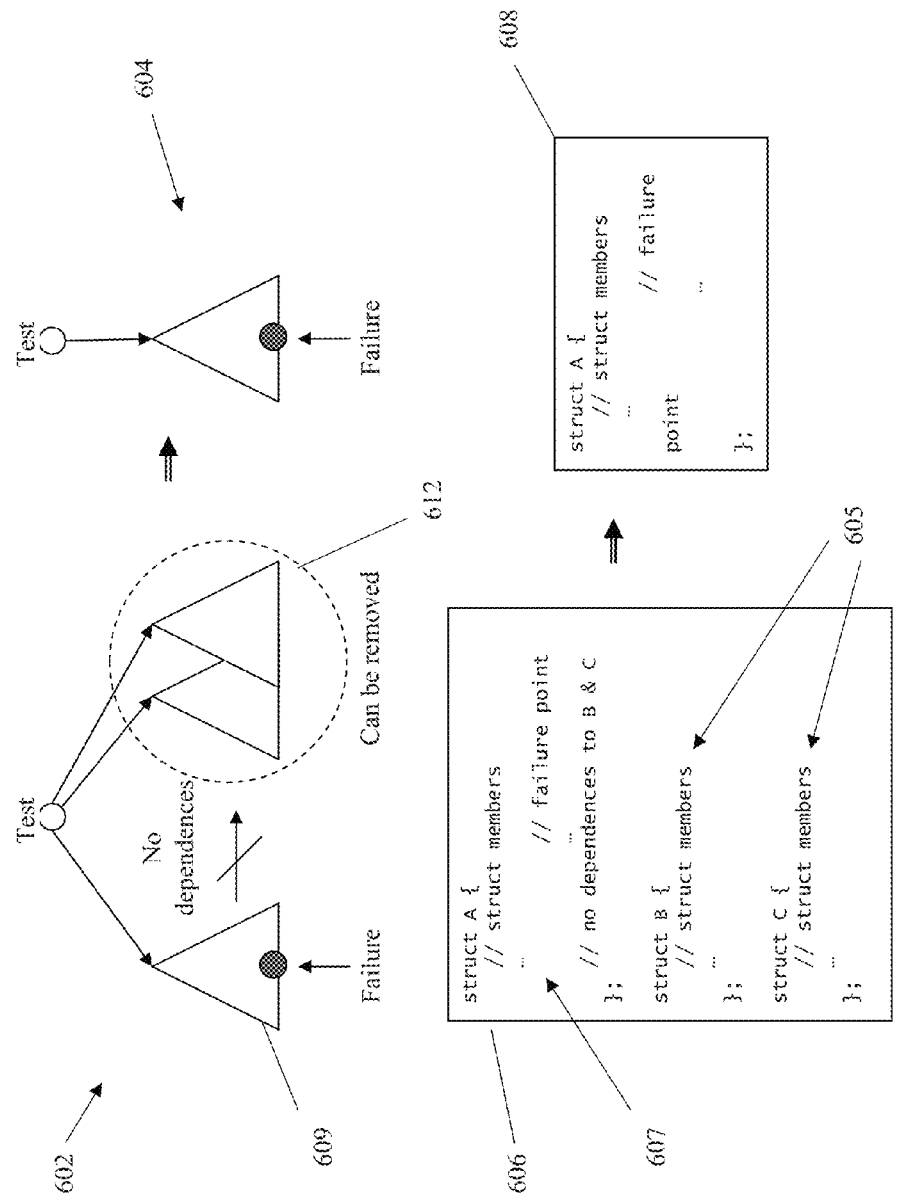
FIGS. 6-11 illustrate example pruning techniques according to some embodiments of the invention.

FIG. 6 illustrates an example technique for pruning a graph based upon removal of disjoint parts of a tree. This approach identifies and prunes all objects that are disconnected form a point of failure by either a syntactic or semantic relationship.

The approach operates by first identifying one or more points of failure, and then identifying all subtrees that are not connected to the tree/subtree associated with the point(s) of failure. If all dependences of failure point are contained in some sub-graph, it is possible to locate and remove disjoint sub-graphs.

In the example of FIG. 6, the original code is shown as code 606 having a failure point 607 within the code 606. It is noted that the failure point is located within the code fragment 607 associated with "struct A". The code also includes code fragments 605 associated with "struct B" and "struct C".

A graph 602 can be created that corresponds to code 606, with the graph 602 showing the failure portion 607 of the code 606 as failure point 609. In this example, the graph 602 makes it very clear that the subtrees 612 associated with code portions 605 for "struct B" and "struct C" do not have a connection either syntactically or semantically with the failure portion 609. Therefore, there are no dependencies between portion 609 and portion 612 on the graph 602.

As a result, portion 612 can be pruned from graph 602, resulting in a smaller graph 604. When code is recreated from the pruned graph 604, this results in the code 608 that no longer contains the code portions 605 for "struct B" and "struct C".

Figure 7:
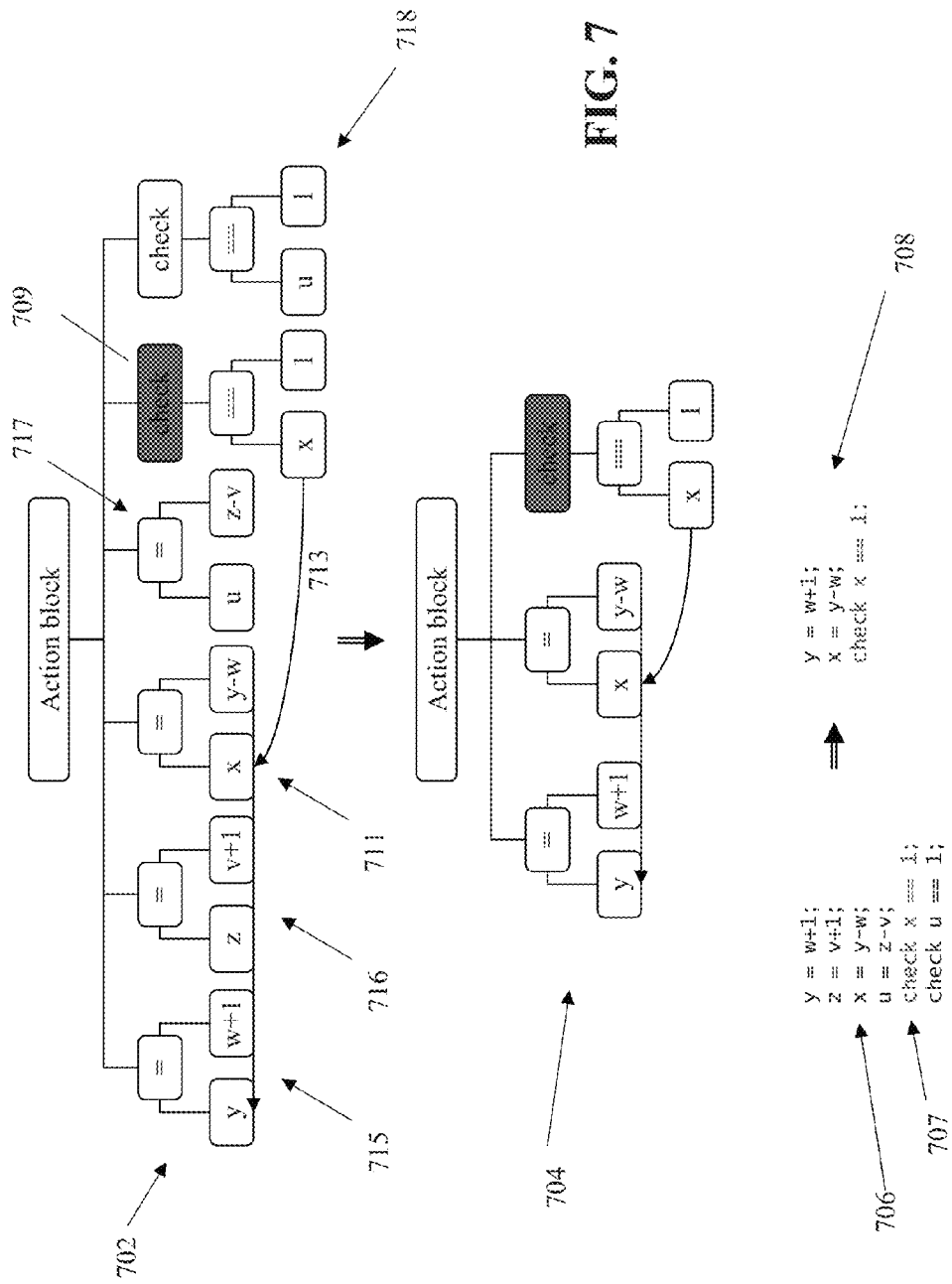

FIG. 7 illustrates an example technique for pruning a graph based upon removal of unrelated procedural code. This approach identifies and prunes all procedural that is disconnected from or unrelated to the procedural code associated with the point of failure.

The approach operates by first identifying one or more points of failure, and then identifying the subtrees associated with the procedural code that corresponds to the failure points. Identification is made of any nodes that do not have dependencies to the nodes associated with the failure points. The nodes that have no dependencies can be pruned form the graph.

In the example of FIG. 7, the original code is shown as code 706 having a failure point 707 associated with the statement "check x==1;". A graph 702 can be created for the actions blocks corresponding to code 706, with the graph 702 showing the failure portion 707 of the code 706 as failure point 709.

The graph 702 makes it very clear that there is a relationship between failure point 709 and subtree 711. This relationship is based upon the fact that code statement 707 is checking the value of a variable "x", and that variable x is operated upon at subtree 711, as indicated by line 713 in the graph 702. Therefore, there is a dependency between portions 709 and 711 in graph 702. However, no such dependency exists between other subtrees 715, 716, 717, and 718 and the failure portion 709. Therefore, these subtrees 715, 716, 717, and 718 can be pruned, resulting in the pruned graph 704. When code is recreated from the pruned graph 704, this results in the code 708 that no longer contains the code portions associated with subtrees 715, 716, 717, and 718.

Figure 8:
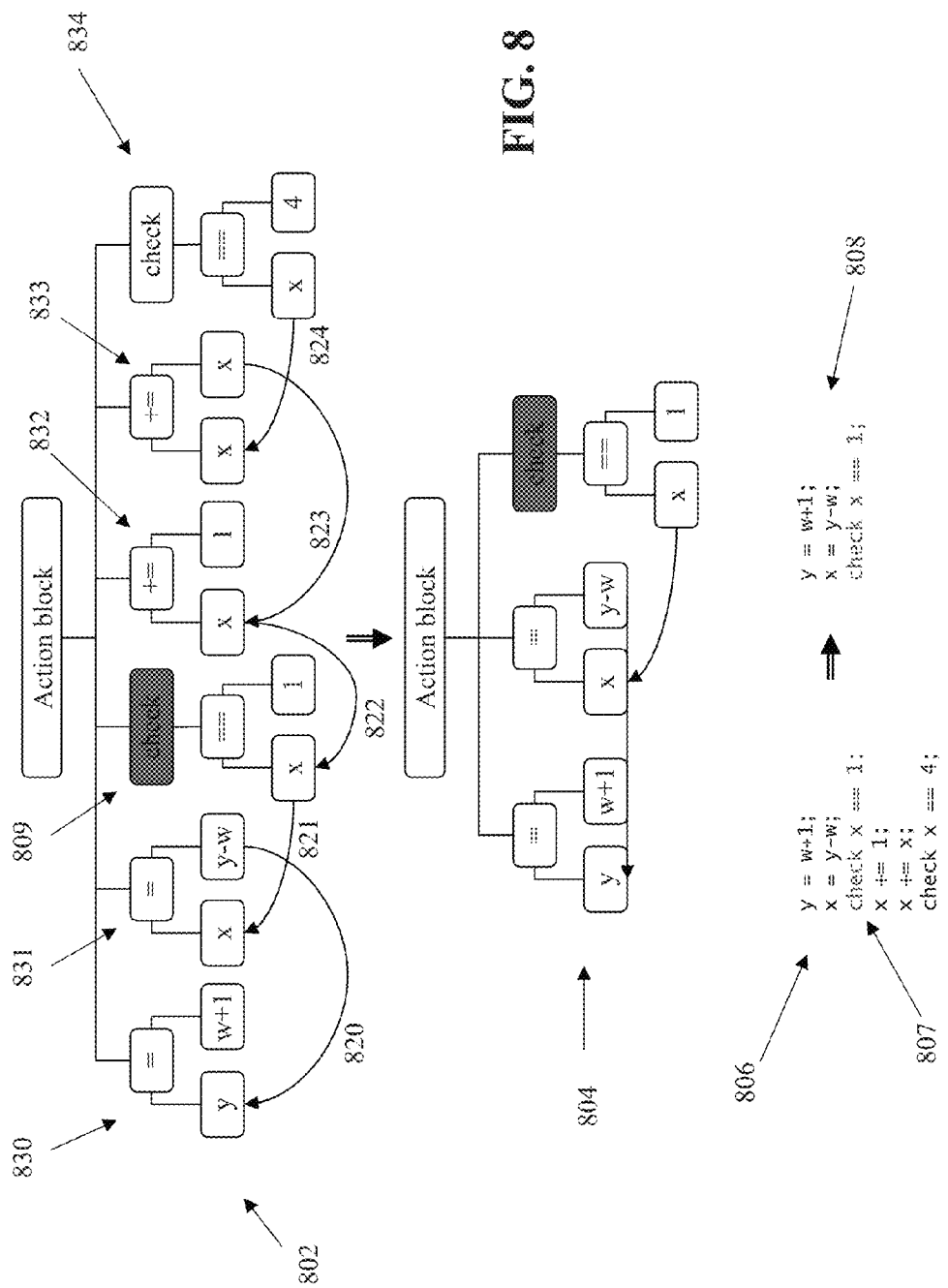

FIG. 8 illustrates an example technique for pruning a graph based upon removal of procedural code after a failure. This approach identifies and prunes all procedural objects that follow a point of failure. The basis of this approach is that it is possible to assume that the procedural code beyond the point of failure is never reached. In such case, the code after a failure can be removed, even if it may have dependences, relationships, or other side effects from removal of the code. As mentioned above, if this assumption is proved to be wrong (e.g., the failure will not remain), then the pruning step can be canceled and rolled back.

The approach operates by identifying the one or more points of failure, and then identifying the subtrees that follow from those points of failure. Those following subtrees can be removed from the graph.

In the example of FIG. 8, the original code is shown as code 806 having a failure point 807 associated with the statement "check x==1;". A graph 802 can be created for the actions blocks corresponding to code 806, with the graph 802 showing the failure portion 807 of the code 806 as failure point 809.

The chain of procedural lines of dependencies are drawn are lines 820, 821, 822, 823, and 824. These lines of dependencies show that the failure portion 809 follows from and are dependent upon blocks 830 and 831. Therefore, blocks 830 and 831 should be retained in any reduced graph.

However, blocks 832, 833, and 834 all correspond to procedural code that are beyond the point of failure at block 809. Therefore, these blocks can be removed form a reduced graph. Therefore, subtrees 832, 833, and 834 can be pruned from graph 802, resulting in the pruned graph 804. When code is recreated from the pruned graph 804, this results in the code 808 that no longer contains the code portions associated with subtrees 832, 833, and 834.

Figure 9:
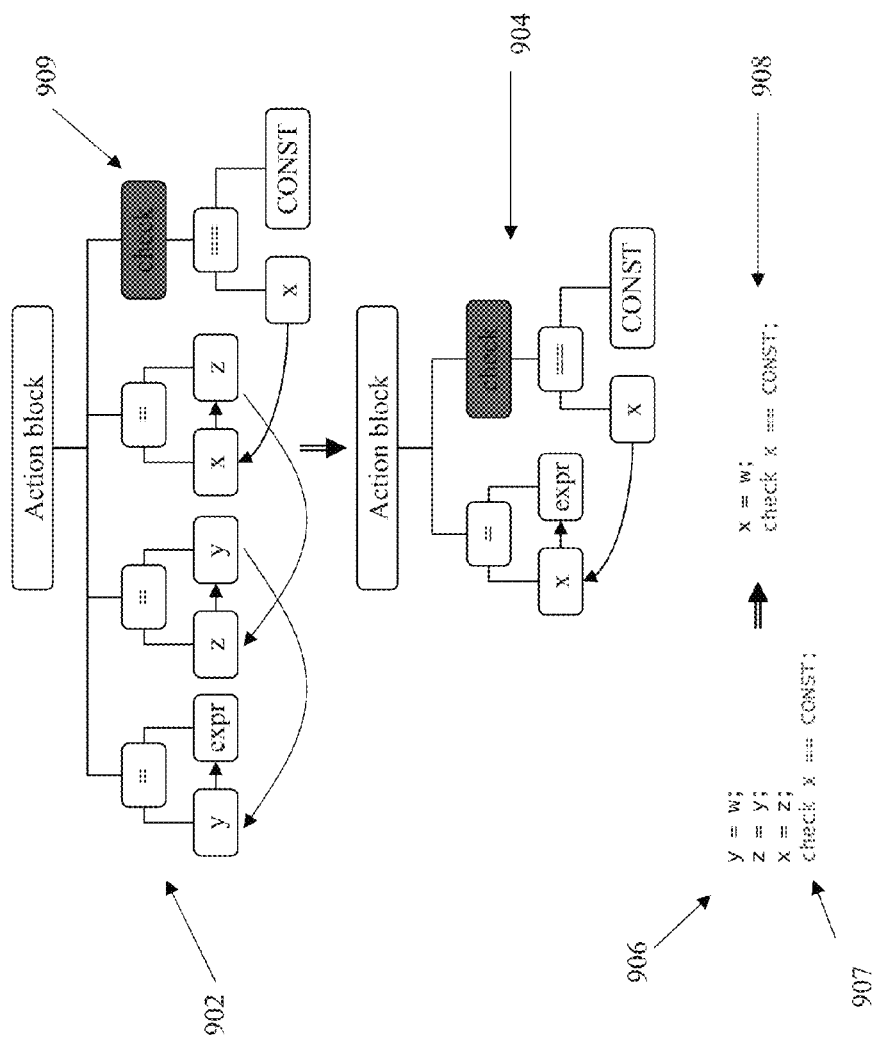

FIG. 9 illustrates an example technique for pruning a graph based upon removal of propagated data values. If value of a variable that causes a failure is copied from second variable, and there is no conditional action beyond the point this value is computed, then the second variable can be removed so that the first variable will get its value at the moment when it is computed.

In the example of FIG. 9, the original code is shown as code 906 having a failure point 907 associated with the statement "check x==CONST;". A graph 902 can be created for the actions blocks corresponding to code 906, with the graph 902 showing the failure portion 907 of the code 906 as failure point 909.

In this example, the value of the "x" variable in the failure point statement 907 is based upon a chain of variable assignments which is propagated throughout the code. This is seen in the code, where variable "y" is assigned the value of "w", variable "z" is assigned the value of "y", and finally variable "x" is assigned the value of "z". In this situation, the subtrees associated with the intermediate propagation of copying can be pruned from the graph, resulting in the pruned graph 904. When code is recreated from the pruned graph 904, this results in the code 908 that no longer contains the code portions associated with subtrees for the intermediate copy propagation.

Figure 10:
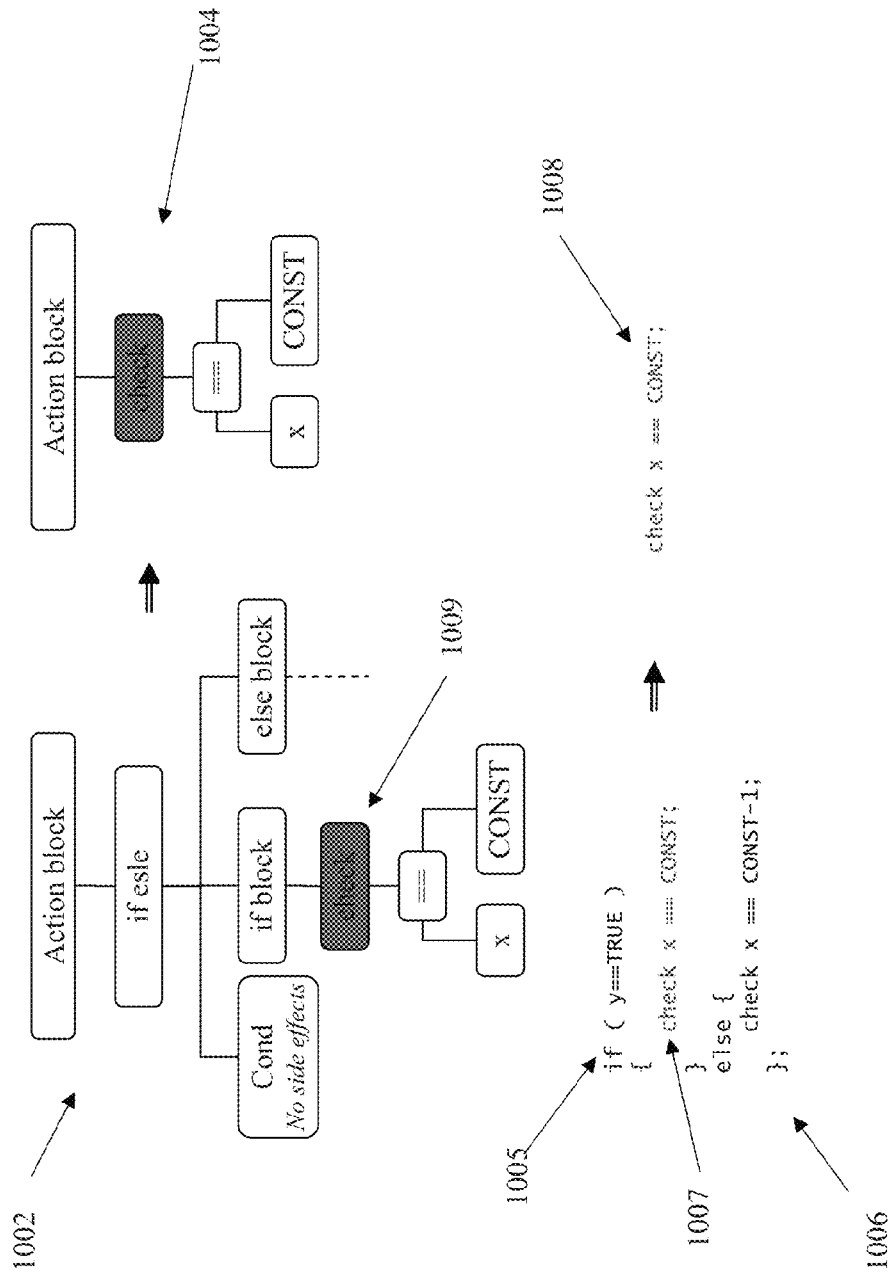
Figure 11:
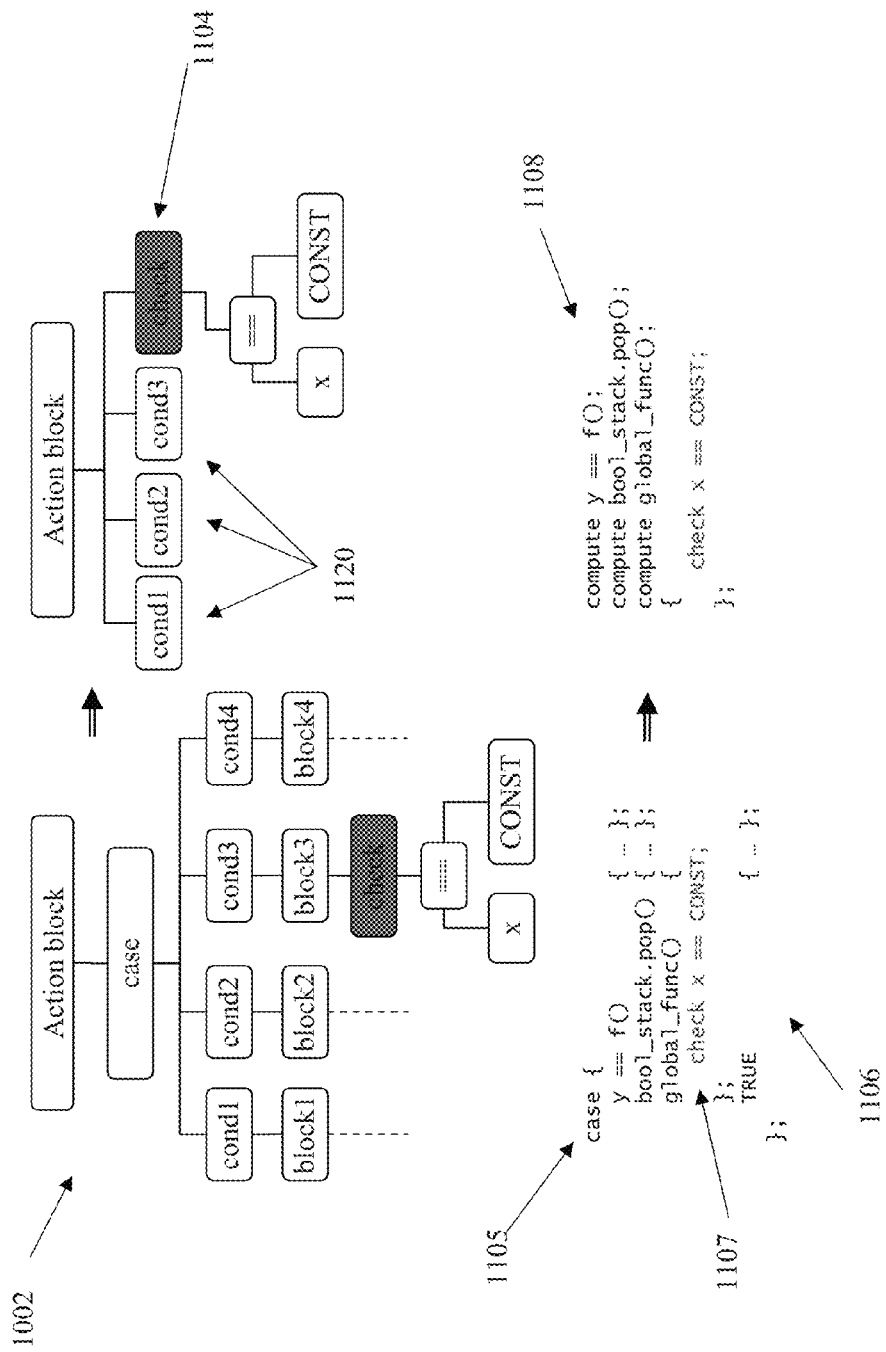

FIGS. 10 and 11 illustrate example techniques for pruning a graph based upon removal of irrelevant branches from the AST. If the failure point is inside a conditional action, then all other branches can be eliminated. This can be performed if checks do not contain expressions with possible side effect or they are not evaluated because failure branch is taken. If condition checks may have side effect, there is still a possibility to eliminate irrelevant branches, but leave those conditions that must be evaluated before failure branch is taken.

In the example of FIG. 10, the original code is shown as code 1006 having a failure point 1007 associated with the statement "check x=CONST;" that is inside the conditional "if" statement 1005. A graph 1002 can be created for the actions blocks corresponding to code 1006, with the graph 1002 showing the failure portion 1007 of the code 1006 as failure point 1009.

In this example, assume that the failure point expression 1007 is not associated with any side effects. Therefore, since the failure point 1007 is inside of a conditional statement 1005, then subtrees associated with the other statements can be eliminated from the graph 1002, resulting in the pruned graph 1004. When code is recreated from the pruned graph 1004, this results in the code 1008 that no longer contains the code portions associated with subtrees for the irrelevant branches. This means that the recreated code 1008 now only contains the statement "check x==CONST;".

In the example of FIG. 11, the original code is shown as code 1106 having a failure point 1107 associated with the statement "check x==CONST;" that is inside the conditional "case" statement 1105. A graph 1102 can be created for the actions blocks corresponding to code 1106, with the graph 1102 showing the failure portion 1107 of the code 1106 as failure point 1109.

Here, the conditional statements may or may not have dependencies associated with the failure point 1107. Therefore, it is semantically safer to recreate the prior statements within the "case" statement 1105 are "compute" statements. Therefore, the subtrees associated with the other conditional statements are eliminated from the graph 1102, but are reconstituted as "compute statements, resulting in the pruned graph 1104 having blocks 1120.

However, it can be assumed that there are no dependencies between the other statements within the "case" statement, and those other statements are not necessary for debussing purposes and can therefore be removed. In this approach, the resulting graph would not include blocks 1120 for the "compute" statements. However, if this assumption is proven to be incorrect, e.g., by checking to see if the expected errors occur, then the approach of FIG. 11 can be taken to include the "compute" statements 1120.

It is noted that these pruning techniques are described by way of example only, and not for purposes of limitation. As would be evident to those of ordinary skill in the art, other pruning techniques may be applied without departing from the scope and spirit of the invention.

System Architecture Overview

Figure 12:
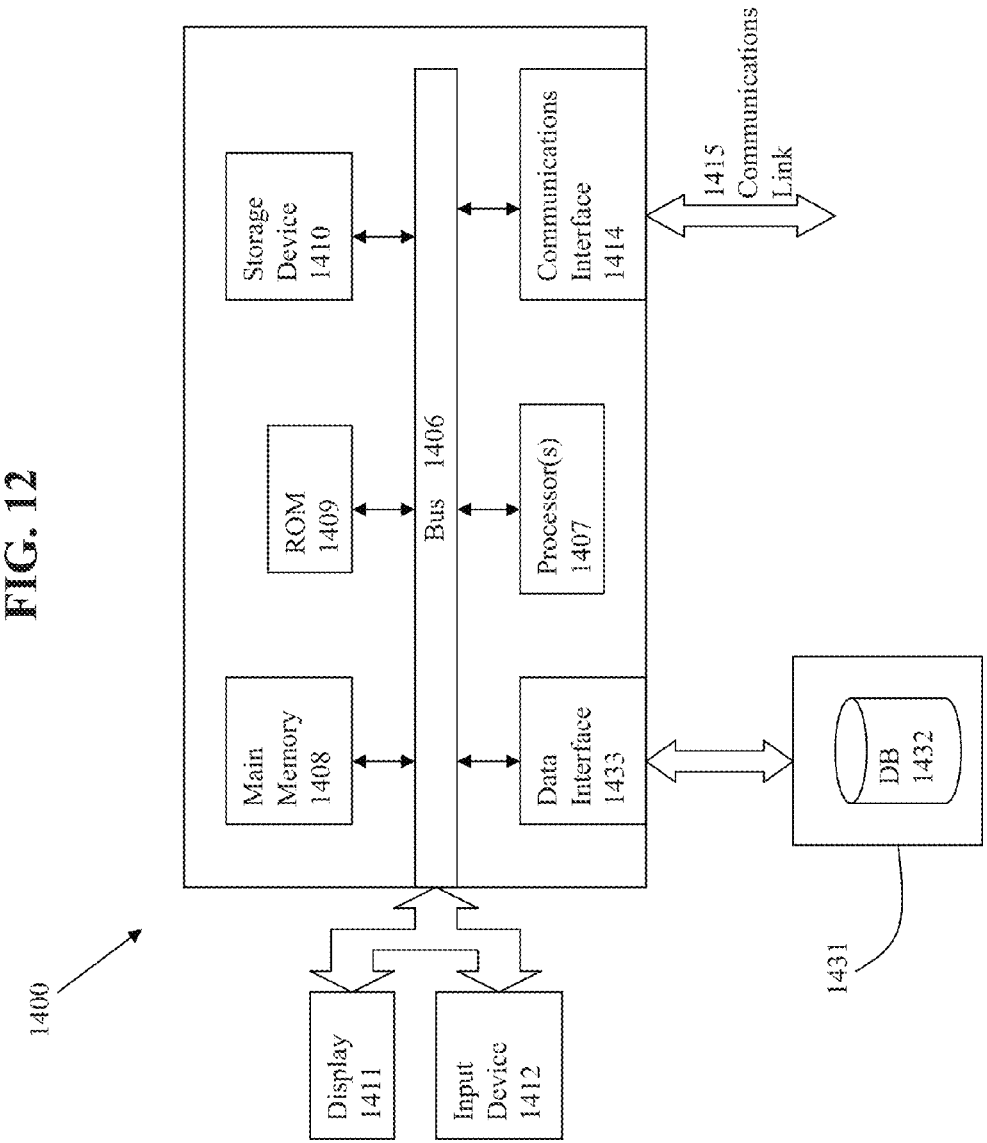
FIG. 12 shows an architecture of an example computing system with which the invention may be implemented.

FIG. 12 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

The invention claimed is:

1. A method implemented with a processor, comprising:
   identifying an original test having one or more errors to analyze;
   creating a graph representation of the original test;
   identifying one or more portions of the graph to prune to create a reduced test;
   pruning the one or more identified portions of the graph to create the reduced test;
   executing the reduced test to verify that the reduced test represents the same one or more errors associated with the original test;
   undoing pruning of the one or more identified portions of the graph when the reduced test fails to represent the same one or more errors associated with the original test;
   analyzing the reduced test to generate analysis results; and
   displaying the analysis results on a display device or storing the analysis results on a computer readable medium.

2. The method of claim 1 in which the original test is a verification test for software, hardware, or a combination of software and hardware.

3. The method of claim 1 in which the original test is machine generated.

4. The method of claim 1 in which the graph is an abstract syntax tree.

5. The method of claim 1 in which the reduced test is created by pruning portions which are not needed to analyze failure in the original test.

6. The method of claim 5 in which the portions to be pruned correspond to branches of the graph that do not have dependencies or critical relationships with points of failure in the original test.

7. The method of claim 6 in which the graph represents syntactic and semantic relationships, and in which the branches that do not have dependencies or critical relationships with points of failure in the original test corresponds to a lack of the syntactic and semantic relationships to the points of failure in the original test.

8. The method of claim 1 in which pruning is performed based upon removal of disjoint parts of the graph.

9. The method of claim 8 which is implemented by identifying one or more points of failure, and identifying subtrees that are not connected to a tree or subtree associated with the one or more points of failure.

10. The method of claim 1 in which pruning is performed based upon removal of unrelated procedural code.

11. The method of claim 10 which is implemented by identifying one or more points of failure, identifying subtrees associated with procedural code that corresponds to the failure points, identifying one or more nodes that do not have dependencies to the subtrees associated with the failure points, and pruning the nodes that do not have dependencies to the subtrees.

12. The method of claim 1 in which pruning is performed based upon removal of procedural code after a failure.

13. The method of claim 12 which is implemented by identifying one or more points of failure, identifying subtrees that follow from the one or more points of failure, and removing the following subtrees from the graph.

14. The method of claim 1 in which pruning is performed based upon removal of propagated data values.

15. The method of claim 14 which is implemented by identifying if a value of a first variable that causes a failure is copied from second variable, and determining whether or not there is a conditional action beyond a point where the value is computed, and removing the second variable so that the first variable will get the value when it is computed.

16. The method of claim 1 in which pruning is performed based upon removal of irrelevant branches from the graph.

17. The method of claim 16 which is implemented by identifying whether a failure point is inside a conditional action, and removing other branches.

18. The method of claim 17 in which the act of removing the other branches is performed if checks do not contain expressions with possible side effect or are not evaluated because a failure branch is taken.

19. The method of claim 1 which is performed iteratively.

20. A system implemented with a processor, comprising:
   means for identifying an original test having one or more errors to analyze;
   means for creating a graph representation of the original test;
   means for identifying one or more portions of the graph to prune to create a reduced test;
   means for pruning the one or more identified portions of the graph to create the reduced test;

means for executing the reduced test to verify that the reduced test represents the same one or more errors associated with the original test;

means for undoing pruning of the one or more identified portions of the graph when the reduced test fails to represent the same one or more errors associated with the original test;

means for analyzing the reduced test to generate analysis results; and means for displaying the analysis results on a display device or storing the analysis results on a computer readable medium.

21. A computer program product that includes a non-transitory computer readable medium, the non-transitory computer readable medium comprising a plurality of computer instructions which, when executed by a processor, cause the processor to execute a process, comprising:

identifying an original test having one or more errors to analyze;

creating a graph representation of the original test;

identifying one or more portions of the graph to prune to create a reduced test;

pruning the one or more identified portions of the graph to create the reduced test;

executing the reduced test to verify that the reduced test represents the same one or more errors associated with the original test;

undoing pruning of the one or more identified portions of the graph when the reduced test fails to represent the same one or more errors associated with the original test;

analyzing the reduced test to generate analysis results; and displaying the analysis results on a display device or storing the analysis results on a non-transitory computer readable medium.

\* \* \* \* \*